United States Patent [19]
Takamizawa et al.

[11] Patent Number: 5,949,587
[45] Date of Patent: Sep. 7, 1999

[54] APPARATUS AND METHOD FOR PRODUCING ORIGINAL PLATE FOR OPTICAL DISC

[75] Inventors: Hiroshi Takamizawa, Saitama; Kazuhito Hori; Atsushi Koshiyama, both of Kanagawa; Takuya Ichikawa; Kunihide Fujii, both of Tokyo, all of Japan

[73] Assignee: Sony Corporation, Tokyo, Japan

[21] Appl. No.: 09/025,793

[22] Filed: Feb. 19, 1998

[30] Foreign Application Priority Data

Feb. 20, 1997 [JP] Japan .................................. 9-036102

[51] Int. Cl.⁶ ..................................................... G02B 9/00

[52] U.S. Cl. ........................................... 359/738; 359/739

[58] Field of Search ..................................... 359/738, 739

[56] References Cited

U.S. PATENT DOCUMENTS

5,016,149   5/1991   Tanaka et al. ........................... 362/259

*Primary Examiner*—Georgia Epps
*Assistant Examiner*—Suzanne Letendre
*Attorney, Agent, or Firm*—Hill & Simpson

[57] ABSTRACT

Disclosed is an apparatus for producing an original plate for optical discs, which is allowed to produce original plates for a plurality of kinds of optical discs satisfying various standards. The apparatus includes a laser light generator for generating laser light; a diaphragm mechanism for limiting laser light generated by the laser light generator; and an objective lens for refracting the laser light limited by the diaphragm mechanism in such a manner that the laser light is focussed on a photosensitive layer or a surface layer formed on the original plate; wherein a spot diameter of a beam of the laser light is changed by varying a diaphragm diameter of the diaphragm mechanism.

7 Claims, 7 Drawing Sheets

APPARATUS AND METHOD FOR PRODUCING ORIGINAL PLATE FOR OPTICAL DISC

BACKGROUND OF THE INVENTION

The present invention relates to an apparatus and a method for producing an original plate for optical discs, and particularly to an apparatus and a method for producing an original plate for optical discs by applying laser light on a photosensitive layer or a surface layer formed on an original plate.

An optical disc such as a CD (trade name, Compact Disc) or DVD (trade name, Digital Versatile Disc) is used to record a digital signal converted from an audio signal or a video signal by forming pits composed of fine irregularities in a surface layer of the optical disc along the circumferential direction; or it is used as an external storage medium for a computer. Such an optical disc is formed from a resin, for example, polycarbonate resin by injection-molding.

An original plate called a stamper is used for injection-molding such an optical disc. The original plate is formed of a circular metal plate having irregularities reversely corresponding to fine irregularities called pits to be formed in the disc. The original plate is produced by a producing apparatus which will be described in the following.

Figure 13:
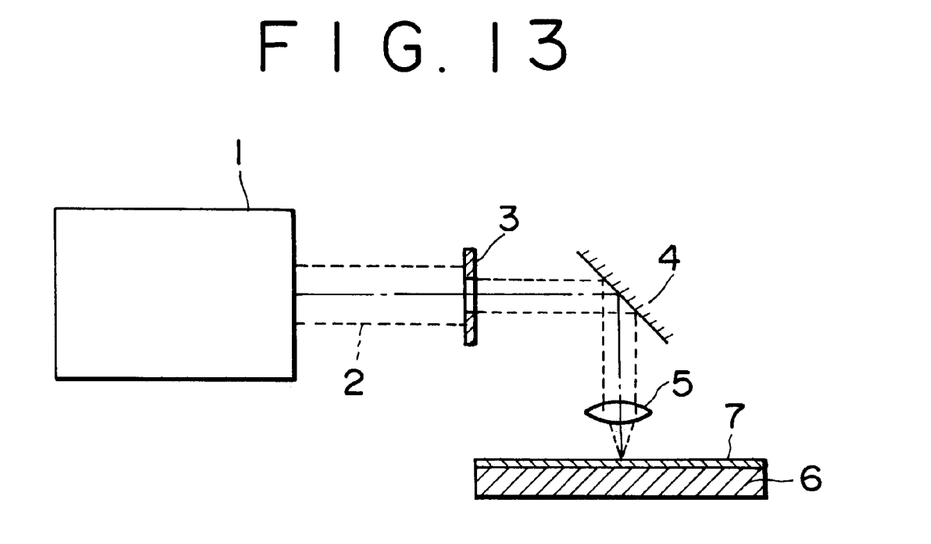
FIG. 13 is a side view of an essential portion of a related art apparatus for producing an original plate for optical discs.

FIG. 13 shows a principle of such an apparatus for producing an original plate for optical discs. The apparatus includes a laser light generator 1; a fixed diaphragm 3 for limiting parallel rays 2 of laser light generated by the laser light generator 1; a mirror 4 for reflecting downward the parallel rays 2 limited by the fixed diaphragm 3; and an objective lens 5 for refracting the parallel rays 2 reflected from the mirror 4 in such a manner that the parallel rays 2 are focussed on an original plate 6. The original plate 6, disposed under the objective lens 5, has a photoresist layer 7 formed on the original plate 6.

The surface of the original plate 6 is washed by a washer, and is coated with the photoresist layer 7 having a thickness of about 100 nm by a resist coater. A signal is recorded in the photoresist layer 7 formed on the original plate 6 by applying a laser beam on the photoresist layer 7 through the objective lens 5. Specifically, the signal is recorded in the photoresist layer 7 by chemically changing, using laser light, a portion of the photoresist layer 7 on which the laser light is applied, or directly processing the original plate 6 using an energy of laser light.

In the case of chemically changing the photoresist layer 7, the original plate 6 is completed by developing the photoresist layer 7 by a developer. Then, a nickel thin film is formed on the original plate by sputtering or electroless plating using a thin film forming system, followed by plating of nickel using the thin film as an electrode to a thickness of about 300 μm by an electroforming system. A nickel sheet is stripped from the original plate 6, followed by removal of the remaining photoresist. Then, inside and outside diameters of the nickel sheet are adjusted depending on the kind of an optical disc to be produced, to complete a stamper. The dimensions of the stamper are shown in Table 1.

TABLE 1

General Diameter of Stamper

| kind of medium | inside diameter | outside diameter |
|---|---|---|
| CD | about 37.6 mm | about 138 mm |
| MD | about 22.0 mm | about 70 mm |
| LD | about 67.0 mm | about 340 mm |

In the above steps of producing an original plate for optical discs, the producing condition is carefully determined such that optical discs produced using the original plate in a plurality of subsequent steps satisfy a standard. Besides, in the case of producing different kinds of media (optical discs), since these media are different from each other in terms of pit shape, size of original plate, and the like, the producing condition is required to be set for each medium. For example, a CD is different from a DVD in terms of shape and size of pit, as in Table 2.

TABLE 2

Comparison in Pit Size between CD and DVD

| | CD | DVD |
|---|---|---|
| pit length | 0.9–3.3 μm | 0.4–1.87 μm |
| pit width | 0.5–0.8 μm | 0.4 μm or less |
| track pitch | 1.6 μm | 0.74 μm |
| capacity | 780 Mbyte | 4.7 Gbyte (one surface/ single layer) |

In the apparatus for producing an original plate for optical discs, various kinds of optical components must be adjusted at high accuracies. For this reason, only one producing condition has been set for one apparatus specialized for one kind of original plate for optical discs. In other words, to produce different kinds of optical discs, it has been required to prepare a plurality of apparatuses specialized for the different kinds of original plates for optical discs. Alternatively, to produce a plurality of kinds of original plates for optical discs using only one apparatus, optical devices and optical components (a laser system, a series of lenses, and a diaphragm) in the producing apparatus have been required to be exchanged or adjusted depending on the kinds of the original plates for optical discs to be produced.

In the case in which different original plates for optical discs are produced using a plurality of apparatuses specialized for the different original plates for optical discs, there occur disadvantages that the cost of equipment becomes higher and also the installation area becomes larger. On the other hand, in the case in which different original plates for optical discs are produced by exchanging or adjusting optical devices in one producing apparatus, there occur disadvantages that it takes a lot of time for exchange or adjustment of the optical devices and also it is difficult to guarantee a stable performance after exchange of the optical devices.

SUMMARY OF THE INVENTION

An object of the present invention is to provide an apparatus and a method for producing an original plate for optical discs, wherein a plurality of kinds of original plates for optical discs can be produced using a common apparatus, and also exchange and adjustment of an optical device can be extremely simply performed upon changing kinds of original plates.

To achieve the above object, according to a first aspect of the present invention, there is provided an apparatus for producing an original plate for optical discs, including: a laser light generator for generating laser light; a diaphragm mechanism for limiting laser light generated by the laser light generator; and an objective lens for refracting the laser light limited by the diaphragm mechanism in such a manner that the laser light is focussed on a photosensitive layer or a surface layer formed on the original plate; wherein a spot diameter of a beam of the laser light is changed by varying a diaphragm diameter of the diaphragm mechanism.

With this configuration, the kind of an original plate for optical discs to be produced can be changed only by varying the diaphragm diameter of the diaphragm mechanism.

The diaphragm diameter may be changed by exchanging a diaphragm plate having an aperture with a diameter corresponding to the spot diameter of the beam of the laser light or disposing or removing the diaphragm plate on or from an optical axis. With this configuration, the kind of an original plate for optical discs to be produced can be changed by exchanging or moving the diaphragm plate.

The diaphragm plate may be removably mounted on a supporting member, and the supporting member may be mounted in such a manner as to be movable between a diaphragm position at which the beam of the laser light is limited and a release position out of an optical path of the beam of the laser light. With this configuration, the diaphragm plate can be freely moved between a working position and a non-working position.

The supporting member may be positioned by a position adjusting member when it is moved to the diaphragm position so that the aperture of the diaphragm plate corresponds to the optical axis of the laser light. With this configuration, a position of the aperture of the diaphragm plate can be accurately adjusted on the optical axis of the laser light.

An aperture with a diameter corresponding to the spot diameter of the beam of the laser light may be formed by an iris diaphragm composed of a plurality of blades arranged in a circumferential direction. With this configuration, the laser light can be limited to correspond to the spot diameter of the beam of the laser light by the aperture of the iris diaphragm.

The diameter of the aperture may be changed by simultaneously turning the plurality of blades constituting the iris diaphragm. With this configuration, the aperture having a desired diameter can be formed by simultaneously turning the plurality of blades.

To achieve the above object, according to a second aspect of the present invention, there is provided a method for producing an original plate for optical discs, in which laser light is focussed on a photosensitive layer or a surface layer formed on the original plate through an objective lens so as to give chemical and/or physical changes to the photosensitive layer or the surface layer on the basis of a signal, the method including the steps of: limiting the laser light on the incident side of the objective lens; and changing a diameter of a central spot of a laser beam focussed on the photosensitive layer or the surface layer by varying a diaphragm diameter for the laser light.

With this configuration, the diameter of the central spot of the beam of the laser light on the photosensitive layer or the surface layer can be freely adjusted. As a result, various original plates of optical discs can be produced using a common producing apparatus.

DETAILED DESCRIPTION OF THE PREFERRED EMBODIMENTS

Figure 1:
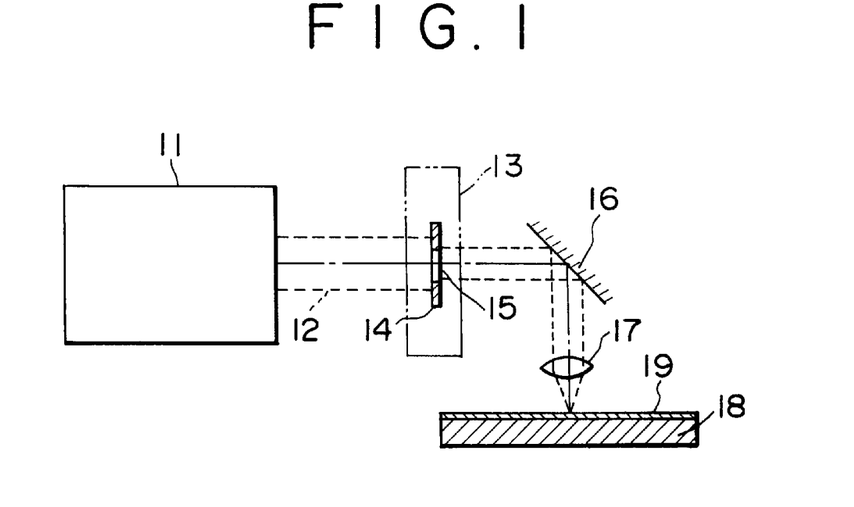
FIG. 1 is a schematic side view of an essential portion of an apparatus for producing an original plate for optical discs.

FIG. 1 is a schematic view showing the entire configuration of an apparatus of producing an original plate for optical discs according to one embodiment of the present invention. The producing apparatus includes a laser light generator 11; a diaphragm changing mechanism 13 for limiting parallel rays 12 of laser light generated by the laser light generator 11; a mirror 16 for reflecting the parallel rays 12 limited by the diaphragm changing mechanism 13; and an objective lens 17 for refracting laser light reflected from the mirror 16.

The diaphragm changing mechanism 13, having a diaphragm plate 14, is adapted to limit parallel rays of laser light through an aperture 15 formed at a central portion of the diaphragm plate 14. The objective lens 17 is adapted to refract the parallel rays such that the parallel rays are focussed on a photoresist 19 formed on a surface of an original glass plate 18.

In summary, the parallel rays 12 of the laser light generated by the laser light generator 11 are limited through the aperture 15 of the diaphragm plate 14 of the diaphragm changing mechanism 13, being reflected from the mirror 16, and are focussed on the photoresist 19 on the original glass plate 18 through the objective lens 17.

Figure 2:
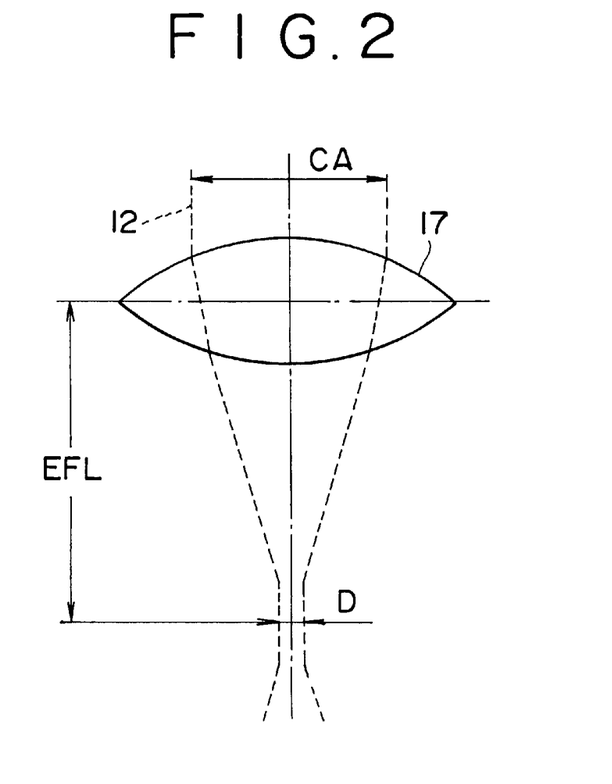
FIG. 2 is a front view showing an action for limiting a light beam through an objective lens.

A diameter D of a central spot (a portion containing 84% of the entire energy) of a beam of laser light focussed on the photoresist 19 on the original glass plate 18 becomes a finite value expressed by the following equation. The diameter D is changed with a diameter CA of an incident laser beam (shown in FIG. 2) taken as a parameter. In the following equation, D indicates a diameter of a central spot; $\lambda$ is a wavelength of light; NA is a numerical aperture; CA is a diameter of an incident laser beam; EFL is a focal distance; and K is an optical constant determined depending on an aperture shape of a lens and an intensity distribution of an incident laser beam, which is typically 1.22.

$$D = K \times \lambda / NA = 2.44 \times (\lambda \times EFL)/CA$$

In this embodiment, the diameter D of the central spot is changed by varying the diameter CA of the incident laser beam using the diaphragm changing mechanism 13 constituting a variable diaphragm device, to thereby perform exposure recording for original plates for various kinds of optical discs using a common producing apparatus.

As is apparent from the above equation, as the diameter CA of the incident laser beam is made smaller by the diaphragm changing mechanism 13, the diameter D of the central spot becomes larger. This is suitable for performing exposure recording for an original plate for CDs. On the contrary, as the diameter CA of the incident laser beam is made larger, the diameter D of the central spot becomes smaller. This is suitable for performing exposure recording for an original plate for DVDs.

Figure 3:
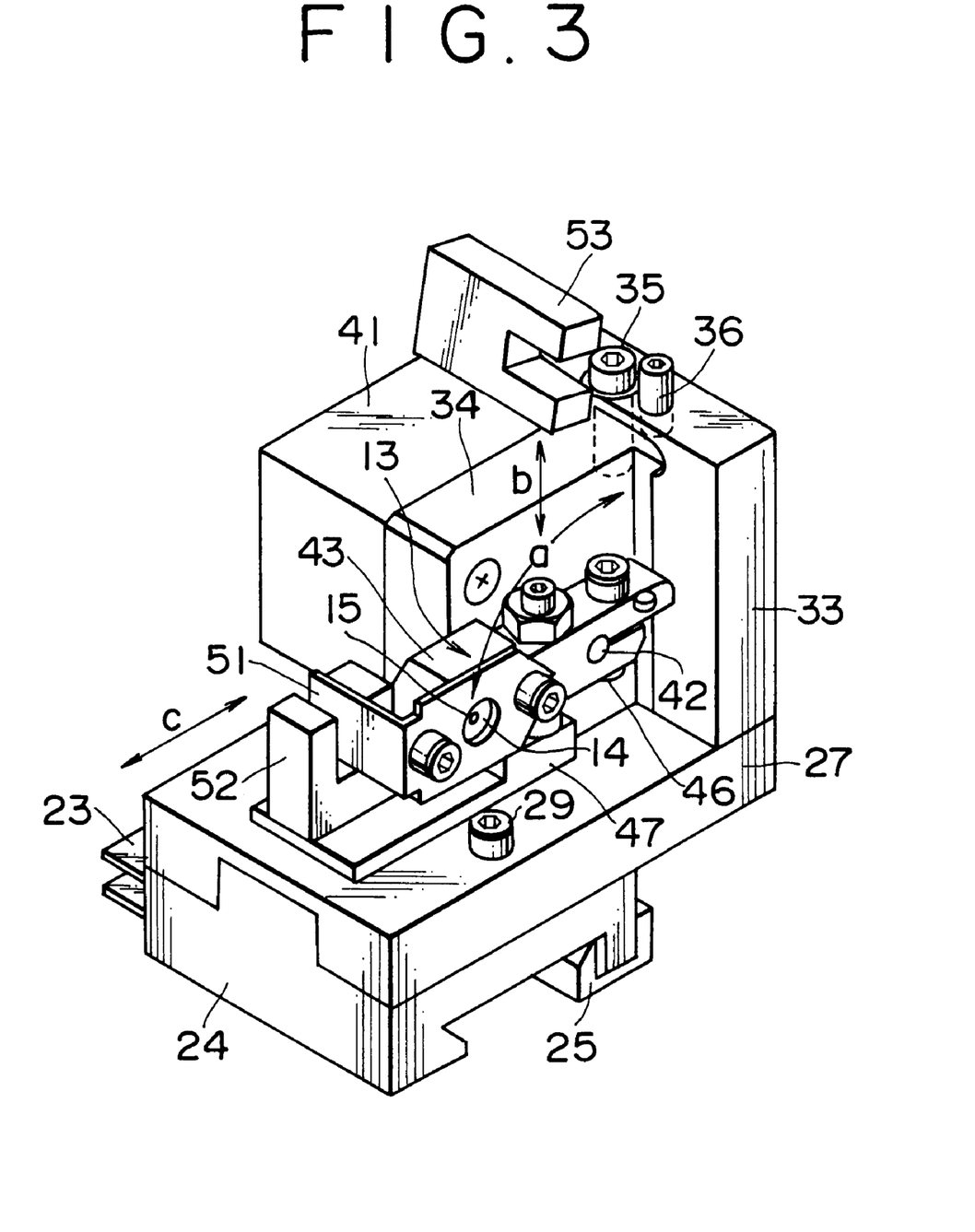
FIG. 3 is a perspective view of a diaphragm changing mechanism using a diaphragm plate.

Next, a configuration of the above diaphragm changing mechanism 13 will be described. The diaphragm changing mechanism 13 is mounted on a rail 23 disposed in parallel to the optical axis of laser light composed of the parallel rays 12. A base 24 is mounted on the rail 23.

On one side of the base 24 is provided a contact member 25. The contact member 25 is moved by adjustment of an adjusting screw 26 in such a manner as to be brought in contact with one side surface of the rail 23. On the base 24 is mounted a supporting plate 27. The supporting plate 27, which is movable in the width direction of the base 24 by adjustment of an adjusting screw 28, is fixed on the base 24 at a specific position by a fixing screw 29.

An upright supporting frame 33 is mounted on the supporting plate 27. A rectangular supporting member 34 is movably mounted to the supporting frame 33. To be more specific, the supporting member 34 is moved up and down along the supporting frame 33 by adjustment of adjusting screws 35 and 36 respectively, and it is fixed on the supporting frame 33 at a specific height by a fixing screw 37.

Figure 4:
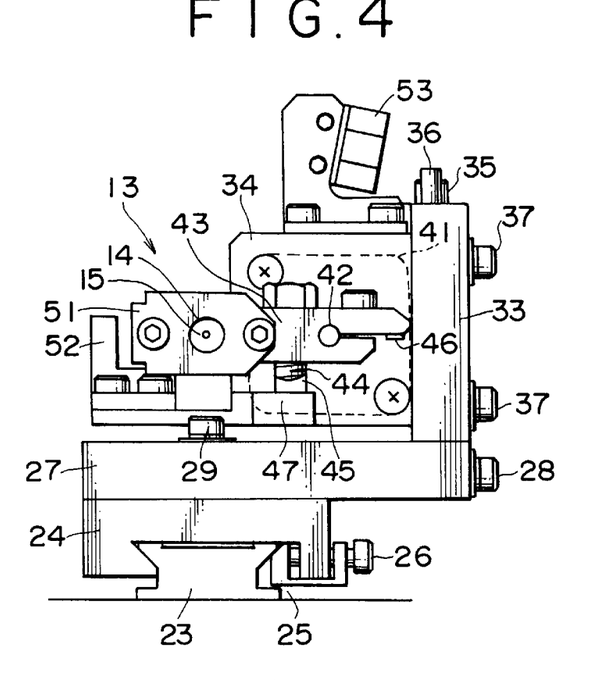
FIG. 4 is a front view of the diaphragm changing mechanism shown in FIG. 3.
Figure 5:
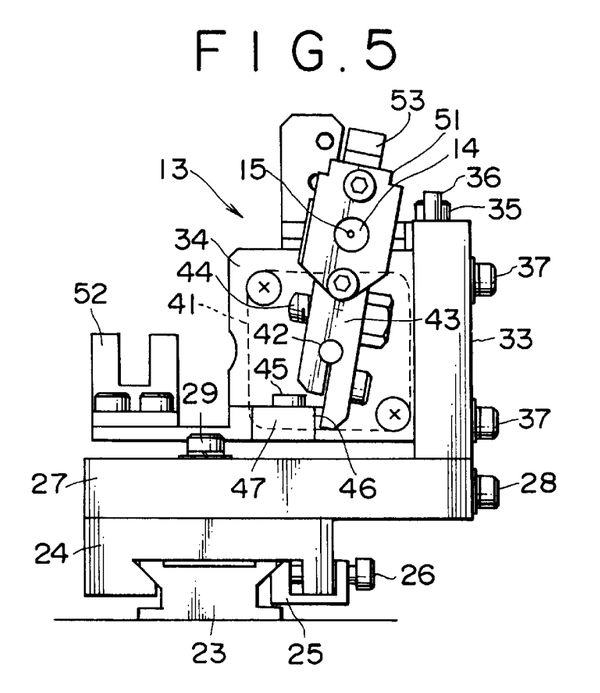
FIG. 5 is a front view of the diaphragm changing mechanism shown in FIG. 3, showing a state in which the diaphragm plate is moved to a non-working position.

An actuator 41 is fixed on a back surface side of supporting member 34. An output shaft 42 of the actuator 41 passes through a center hole of the supporting member 34 and projects on the front surface side of the supporting member 34. A supporting lever 43 is fixed on a leading end portion of the output shaft 42. The supporting lever 43 has at a lower side portion thereof a position adjusting member 44, and is positioned at a working position shown in FIG. 4 by bringing the position adjusting member 44 in contact with a stopper 45. The supporting lever 43 has also on its end portion on the base end side a damper member 46, and is positioned at a non-working position by bringing the damper member 46 in contact with a side portion of a base 47 for supporting the stopper 45 as shown in FIG. 5.

The above diaphragm plate 14 is mounted on a leading end portion of the supporting lever 43. The aperture 15, which is composed of a small circular hole, is formed in a center portion of the diaphragm plate 14. The parallel rays 12 are limited through the aperture 15.

A plate 51 to be detected is mounted at the leading end portion of the supporting lever 43 in a state being bent. When the supporting lever 43 is turned to the working position, the position of the plate 51 is detected by a position detecting sensor 52. Besides, when the supporting lever 43 is moved to the non-working position, the position of the plate 51 is detected by a position detecting sensor 53.

In this way, the aperture 15 is composed of a circular small hole formed in a metal made diaphragm plate 14, and it functions to limit laser light rays into a shape corresponding to that of the hole. The diaphragm plate 14 having such a pin hole 15 is fixed on the supporting lever 43 and is turned, by the actuator 41 mounted on the back surface side of the supporting member 34 through the supporting lever 43, between the working position on the optical axis (see FIG. 4) and the non-working position out of the optical axis (see FIG. 5) as shown by an arrow "a" in FIG. 3.

As the actuator 41 for turning the diaphragm plate 14, there may be used a rotary solenoid, a motor, or a motor with a reduction gear. The supporting lever 43 for supporting the diaphragm plate 14 is, as shown in FIG. 4, positioned at the working position by bringing the position adjusting member 44 provided on the lower portion of the supporting lever 43 in contact with the stopper 45 formed on the base 47. On the contrary, as shown in FIG. 5, the supporting lever 43 having the diaphragm plate 14 is stopped and held at the non-working position by bringing the damper member 46 mounted on the base end portion of the supporting lever 43 in contact with the side end surface of the base 47.

At both the working position shown in FIG. 4 and the non-working position shown in FIG. 5, the supporting lever 43 is applied with a moment turned in the switching direction by the gravity, so that the supporting lever 43 does not need a drive force for holding the supporting lever 43 after being switched between the working position and the non-working position. The use of the actuator 41 of a type generating a holding torque in the switching direction by a permanent magnet allows the supporting lever 43 to be held at the switched position after cut-off of a power source of the switching mechanism. This is effective to compensate for a driving force for holding the supporting lever 43. By adopting such a drive force for holding the supporting lever 43 without carrying of any current, it becomes possible to record signals in an original plate for optical discs at a high accuracy by suppressing occurrence of mechanism vibration and heat generation.

The adjustment of a position of the aperture 15 of the diaphragm plate 14 mounted on the supporting lever 43, that is, positioning of the center of the aperture 15 with respect to the optical axis may be performed by adjustment of the position of the supporting member 34.

After the fixing screw 37 is loosened, the supporting member 34 for supporting the supporting lever 43 through the actuator 41 can be moved upward by adjustment of the adjusting screw 35 and moved downward by adjustment of the adjusting screw 36. Accordingly, positioning of the aperture 15 of the diaphragm plate 14 in the height direction can be performed by adjusting the height of the aperture 15 using the adjusting screws 35 and 36 and fastening the fixing screw 37 in such an adjusted state.

Similarly, the adjustment can be performed for the supporting plate 27 on which the supporting member 34 is fixed. To be more specific, after the fixing screw 29 is loosened, the supporting plate 27 is moved in the lateral direction with respect to the base 24 by adjustment of the adjusting screw 28, thus allowing the lateral position of the aperture 15 to correspond to the center of the laser light. The fixing screw 29 is then fastened in such an adjusted state, to thereby position the aperture 15 of the diaphragm plate 14 in such a state that the lateral position of the aperture 15 corresponds to the center of the laser light.

The plate 51 to be detected, which is mounted at the leading end of the supporting lever 43, is detected at the working position by the position detecting sensor 52, and also detected at the non-working position by the position detecting sensor 53. Accordingly, the switched position can be confirmed on the basis of the detected result. In addition, as each of the position detecting sensors 52 and 53, a photo-microsensor or the like may be used.

According to such a diaphragm changing mechanism 13 provided in the apparatus for producing an original plate for optical discs, the diaphragm plate 14 supported by the supporting lever 43 may be exchanged or the supporting lever 43 may be turned by driving of the actuator 41 depending on the kind of the original plate for optical discs. To be more specific, the supporting lever 43 is turned to the release position to remove the diaphragm plate 14, and a different diaphragm plate 14 suitable for to a new kind of an original plate is mounted or the diaphragm plate 14 on the supporting lever 43 is turned by the actuator 41 to be switchingly moved between the diaphragm position and the release position. This is effective to significantly shorten the switching time. The position of the aperture 15 after switching of the diaphragm plate 14 is determined by adjusting the turning position of the supporting lever 43 using the position adjusting member 44 and the positions of the supporting member 34 in the height direction and the lateral direction. This makes it possible to keep the switching position of the diaphragm plate 14 at a high accuracy.

In the case where the position of the aperture 15 of the diaphragm plate 14, that is, the position of the pin hole is offset, the position of the aperture 15 is easily allowed to correspond to the optical axis by adjusting the supporting member 34 in the vertical direction using the adjusting screws 35 and 36 and also adjusting the supporting member 34 to be moved in the lateral direction using the adjusting screw 28. Further, since the aperture 15 is formed of a pin hole perforated in the metal made diaphragm plate 14, it has a high dimensional accuracy.

In the state in which the supporting lever 43 is turned to the working position or non-working position, the diaphragm changing mechanism is applied with a moment due to the gravity so as to be held at the position, and consequently, any holding power is not required after switching of the diaphragm plate 14 supported by the supporting lever 43. In the diaphragm changing mechanism, therefore, there is no problem in terms of occurrence of vibration and heat generation due to a drive force for holding the supporting lever 43.

Another embodiment of the diaphragm changing mechanism 13 will be described with reference to FIGS. 6 to 9. In this embodiment, parts corresponding to those in the previous embodiment shown in FIGS. 3 to 5 are indicated by the same reference numerals, and the explanation thereof is omitted.

Figure 6:
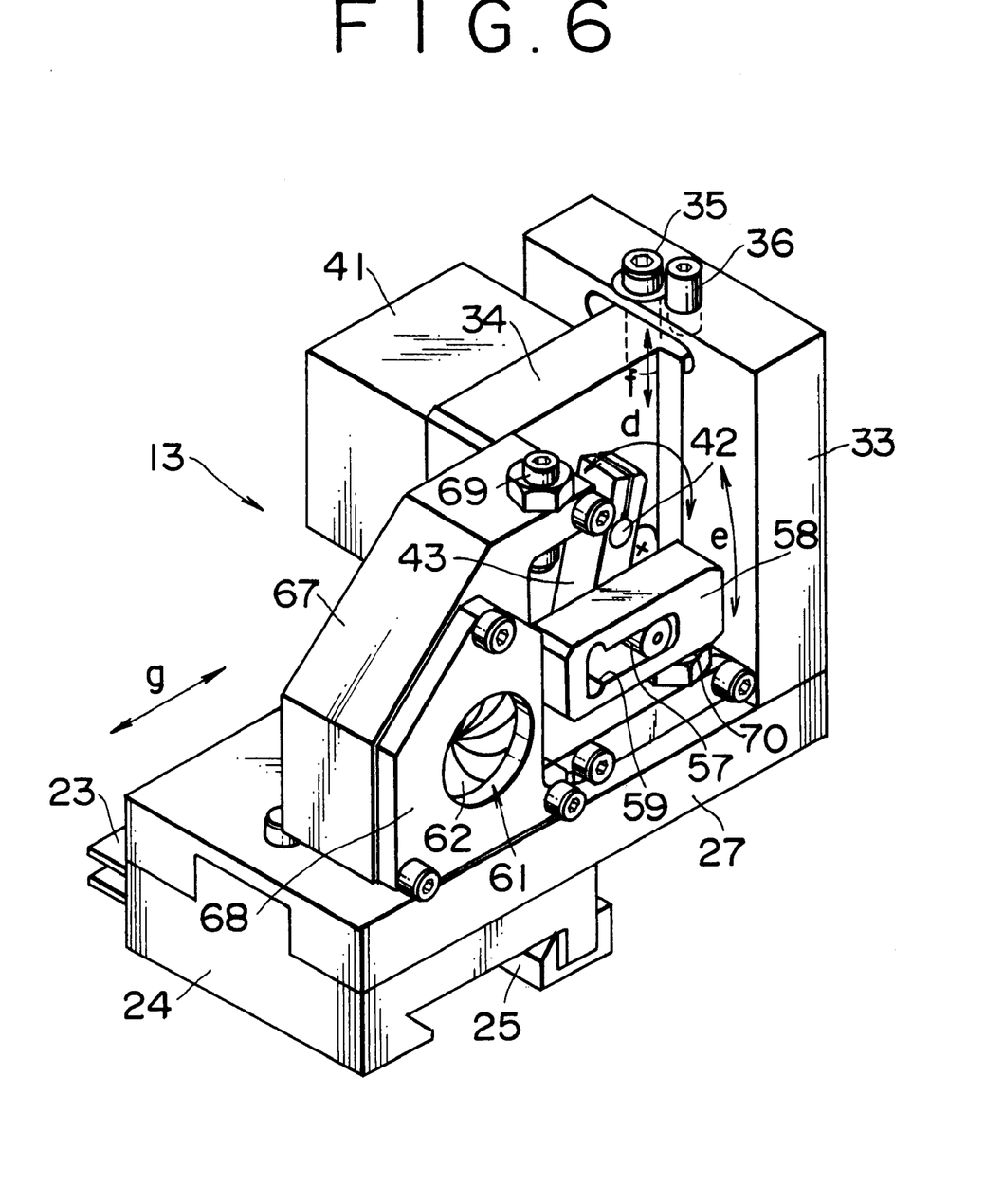
FIG. 6 is a perspective view of a diaphragm changing mechanism using an iris diaphragm.

In this embodiment, a supporting lever 43 is mounted on an output shaft of an actuator 41, and a roller 57 is rotatably supported by the supporting lever 43. The roller 57 is received in a guide hole 59 of a guide member 58. The guide member 58 is mounted to a leading end portion of a lever 60.

Figure 9:
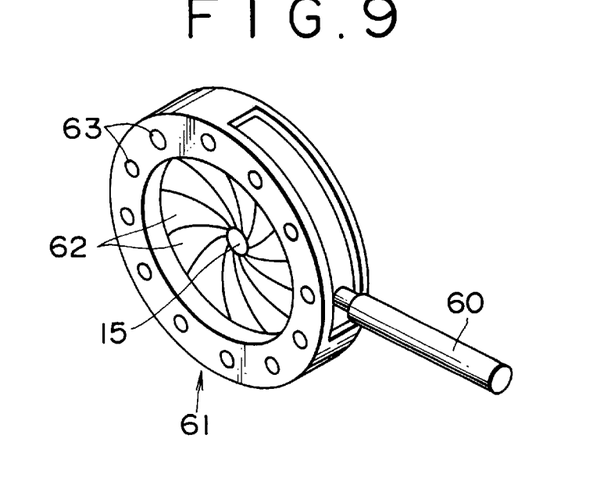
FIG. 9 is a perspective view of the iris diaphragm.

The lever 60 is adapted to adjust a limitation degree of an iris diaphragm 61. The iris diaphragm 61 has a plurality of blades 62 which are rotatably supported on an outer peripheral frame portion by pins 63. A diameter of a aperture 15 of the iris diaphragm 61 can be continuously changed by simultaneously turning the blades 62 by turning the lever 60.

The iris diaphragm 61 is mounted on a mounting base 67, and is pressed by a pressing piece 68. In addition, the mounting base 67 is supported by a supporting member 34.

Figure 7:
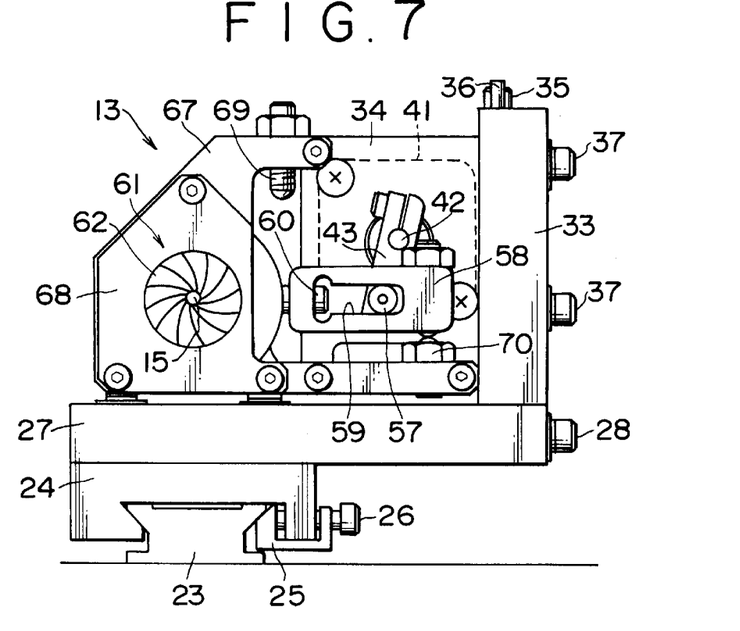
FIG. 7 is a front view of the diaphragm changing mechanism shown in FIG. 6.
Figure 8:
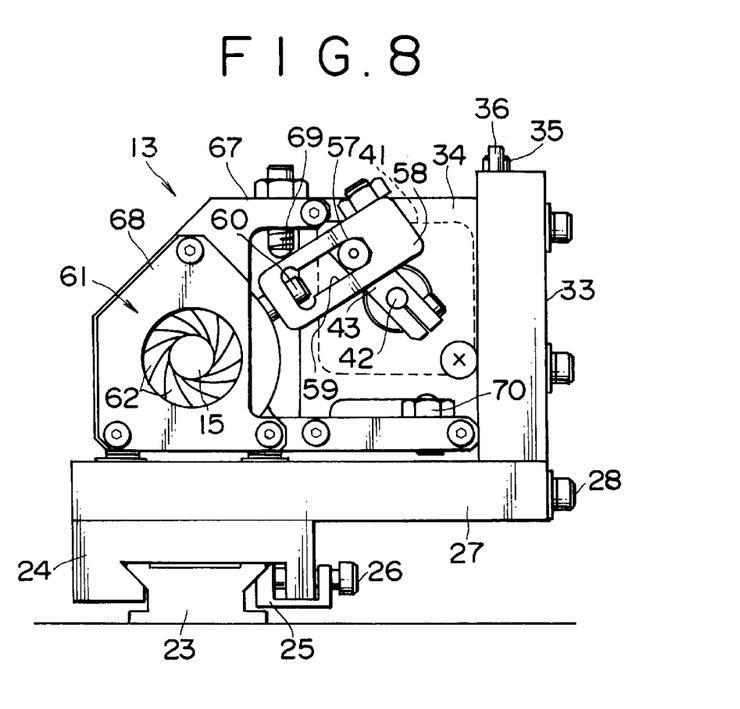
FIG. 8 is a front view of the diaphragm changing mechanism shown in FIG. 6, showing a state in which an aperture is largely opened.

The guide member 58 mounted on the lever 60 of the iris diaphragm 61 is brought in contact with a stopper 69 at an upper turning position, and is brought in contact with a stopper 70 at a lower turning position.

In such a modified embodiment, there is used the iris diaphragm 61 in which the plurality of blades 62 are turned around the pins 63 rotatably mounted on the frame by operating the lever 60 shown in FIG. 9, to thus change the diaphragm diameter. The lever 60 of the iris diaphragm 61 is connected to the guide member 58 which is rotated by the actuator 41. When the supporting lever 43 is rotated in the direction shown by an arrow "d" in FIG. 6 by the actuator 41, the roller 57 mounted on the supporting lever 43 is smoothly rotated in the guide hole 59 of the guide member 58, to convert the motion of the supporting lever 43 into a turning motion of the guide member 58 shown by an arrow "e". Thus, the diameter of the aperture 15 of the iris diaphragm 61 is changed.

The upper stopper 69 and the lower stopper 70 determine the upper and lower stoppage positions of the guide member 58, respectively, to thus adjust the limitation amount of the iris diaphragm 61. In addition, the supporting member 34 on which the diaphragm changing mechanism 13 is mounted is added with a mechanism for aligning the center position of the iris diaphragm 61 to the optical axis. To be more specific, after a fixing screw 37 is loosened, the supporting member 34 can be moved upward by an adjusting screw 35 or moved downward by an adjusting screw 36. Further, by moving the supporting plate 27 in the lateral direction with respect to a base 24, the center position of the iris diaphragm 61, that is, the position of the aperture 15 can be adjusted to be moved in the lateral direction.

The use of the actuator 41 of a type generating a holding torque in the switching direction by a permanent magnet allows the supporting lever 43 to be held at the switched position after cut-off of a power source of the switching mechanism. This is effective to suppress mechanism vibration and heat generation due to a drive force applied by current-carrying for holding the supporting lever 43.

With this configuration, it is possible to simply realize the variable diaphragm mechanism in which the diaphragm diameter is changed by the iris diaphragm 61, and to cope with a change in kind of the original plate for optical discs for a short switching time. In particular, since the iris diaphragm 61 is adopted in this embodiment, the diameter of the aperture 15 of the iris diaphragm 61 can be freely adjusted by the actuator 41.

Further, according to such an apparatus, positioning of the aperture 15 with respect to the optical axis can be easily adjusted by moving the supporting member 34 in the vertical direction and also moving the supporting plate 27 in the lateral direction. Additionally, since the apparatus does not need a power for holding the supporting lever after switching thereof, there is no problem in terms of vibration and heat generation due to a drive force for holding the supporting lever.

Figure 10:
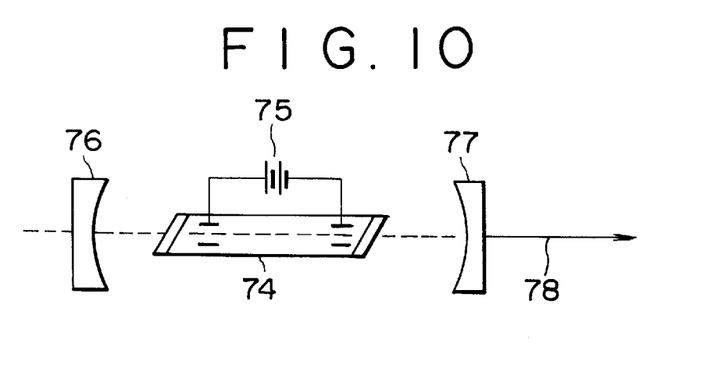
FIG. 10 is a front view of an essential portion of a laser generator using a gas laser.

Next, there will be described a laser light generator used in combination of the diaphragm changing mechanism of a pin hole type or the diaphragm changing mechanism using the iris diaphragm 61. FIG. 10 shows a laser light generator using a gas laser, which includes a glass cylinder 74, a power source 75, a total reflection mirror 76, and a partial reflection mirror 77.

In this laser generator using a gas laser, laser oscillation is performed by pumping a gas of a negative temperature material enclosed in the glass cylinder 74 by discharge by the power source 75 or optical pumping and performing feedback of the pumped gas between the total reflection mirror 76 and the partial reflection mirror 77, to take out a laser output 78. Such a laser output 78 is limited by the above diaphragm changing mechanism 13.

Figure 11:
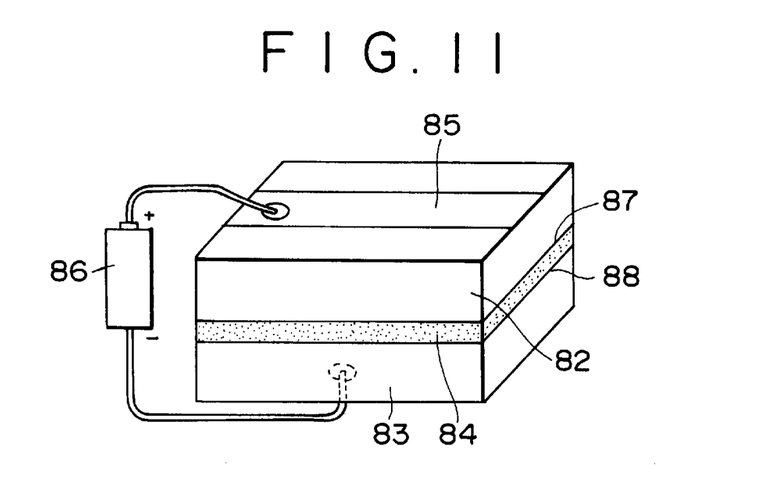
FIG. 11 is a perspective view of an essential portion of a laser generator using a semiconductor laser.

Another laser light generator using a semiconductor laser is shown in FIG. 11. The semiconductor laser has a diode structure in which a p-type semiconductor 82 is joined to an n-type semiconductor 83 at a central portion. When a voltage is applied from a power source 86 through a stripe electrode 85 to an emission layer 84 on the p-n junction portion, the temperature of the emission layer 84 becomes negative, to cause laser oscillation between mirrors 87 and 88 formed by cleavage of crystal, thereby outputting laser light.

Figure 12:
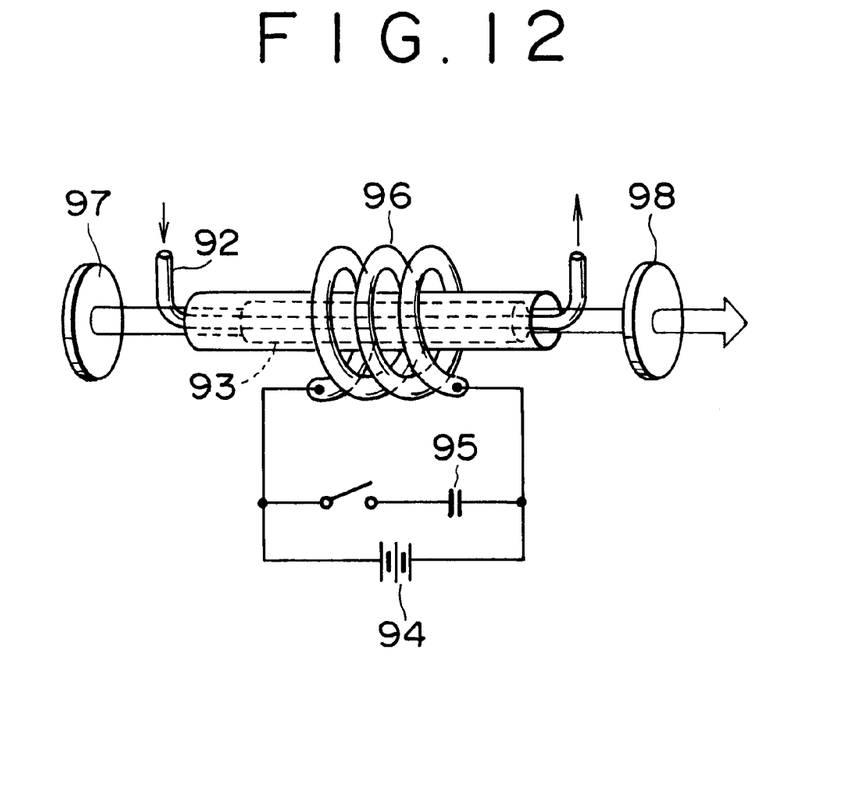
FIG. 12 is a perspective view of an essential portion of a laser generator using a solid laser.

A further laser light generator using a solid laser is shown in FIG. 12. In this generator, a crystal 93 of ruby or the like, which is prevented from being heated by allowing cooling water to pass through a cooling pipe 92, is subjected to optical pumping using a flash lamp 96 for emitting light by a circuit composed of a power source 94 and a capacitor 95. As a result, laser oscillation is generated between a total reflection mirror 97 and a partial reflection mirror 98, to output laser light. Then, parallel rays of the laser light thus generated at the laser light generator are limited by the diaphragm changing mechanism 13.

The apparatus and the method of producing an original plate for optical discs according to the present invention, is allowed to produce various kinds of original plates for optical discs by changing a diameter of a beam of laser light by changing the aperture 15 using the diaphragm changing mechanism 13 depending on the kind of the original plate. That is, mechanisms and devices of optical system in the producing apparatus can be commonly used for producing various kinds of original plates for optical discs. This is advantageous in making small the size of the apparatus and reducing the production cost. For example, the apparatus for producing an original plate for optical discs can be commonly used for producing two kinds of original plates for CDs and DVDs. In this case, it is possible to shorten a time required for switching the apertures of the two kinds of original plates for CDs and DVDs to each other. In addition, the diaphragm changing mechanism of the producing apparatus is described by example of the pin hole type diaphragm mechanism and the iris diaphragm mechanism in the above embodiments; however, the present invention is not limited thereto but can be applied to other diaphragm changing mechanisms each having the same function.

For example, in the embodiments, movement of the pin hole is performed by rotating the pin hole in the direction perpendicular to the optical axis; however, it may be performed by shifting the pin hole in the direction crossing the optical axis in a parallel translation manner, by turning the pin hole around a different rotational axis, or by a combination thereof.

In the embodiment, the lever 60 of the iris diaphragm 61 is driven using the roller 57 and the guide member 58; however, it may be driven by other mechanisms.

Further, in the variable diaphragm mechanism 13 including the diaphragm plate 14 having the pin hole type aperture 15 or the diaphragm mechanism using the iris diaphragm 61, the supporting lever is held at a switched position using the rotating device for generating a holding torque; however, the present invention is not limited thereto. That is, the supporting lever can be held by a different drive device or holding mechanism having the same purpose or function.

What is claimed is:

1. An apparatus for producing an original plate for optical discs, comprising:
    a laser light generator for generating laser light;
    a diaphragm mechanism for limiting laser light generated by said laser light generator; and
    an objective lens for refracting the laser light limited by said diaphragm mechanism in such a manner that the laser light is focussed on a photosensitive layer or a surface layer formed on said original plate;
    wherein,
    a spot diameter of a beam of the laser light is changed by varying a diaphragm diameter of said diaphragm mechanism, and
    said diaphragm is changed by exchanging a diaphragm plate having an aperture with a diameter corresponding to the spot diameter of the beam of the laser light or disposing or removing said diaphragm plate on or from an optical axis.

2. An apparatus for producing an original plate for optical discs according to claim 1, wherein said diaphragm plate is removably mounted on a supporting member, and said supporting member is mounted in such a manner as to be movable between a diaphragm position at which the beam of the laser light is limited and a release position out of an optical path of the beam of the laser light.

3. An apparatus for producing an original plate for optical discs according to claim 2, wherein said supporting member is positioned by a position adjusting member when it is moved to the diaphragm position so that said aperture of said diaphragm plate corresponds to the optical axis of the laser light.

4. An apparatus for producing an original plate for optical discs, comprising:
    a laser light generator for generating laser light;
    a diaphragm mechanism for limiting laser light generated by said laser light generator; and
    an objective lens for refracting the laser light limited by said diaphragm mechanism in such a manner that the laser light is focussed on a photosensitive layer or a surface layer formed on said original plate;
    wherein,
    a spot diameter of a beam of the laser light is changed by varying a diaphragm diameter of said diaphragm mechanism, and
    an aperture with a diameter corresponding to the spot diameter of the beam of the laser light is formed by an iris diaphragm composed of a plurality of blades arranged in a circumferential direction.

5. An apparatus for producing an original plate for optical discs according to claim 4, wherein the diameter of said aperture is changed by simultaneously turning said plurality of blades constituting said iris diaphragm.

6. A method for producing an original plate for optical discs, in which laser light is focussed on a photosensitive layer or a surface layer formed on the original plate through an objective lens so as to give chemical and/or physical changes to the photosensitive layer or the surface layer on the basis of a signal, said method comprising the steps of:
    limiting the laser light on the incident side of the objective lens; and
    changing a diameter of a central spot of a laser beam focussed on the photosensitive layer or the surface layer by varying a diameter for the laser light by exchanging a diaphragm plate having an aperture with a diameter corresponding to the spot diameter of the beam of the laser light or disposing or removing said diaphragm plate on or from an optical axis.

7. A method for producing an original plate for optical discs, in which laser light is focused on a photosensitive layer or a surface layer formed on the original plate through an objective lens so as to give chemical and/or physical changes to the photosensitive layer or the surface layer on the basis of a signal, said method comprising the steps of:

limiting the laser light on the incident side of the objective lens; and changing a diameter of a central spot of a laser beam focused on the photosensitive layer or the surface layer by varying a diaphragm diameter for the laser light, said diaphragm diameter being varied by moving a diaphragm plate between a diaphragm position at which the beam of laser light is limited and a release position out of an optical path of the beam of laser light.

* * * * *